(12) United States Patent
Chiba

(10) Patent No.: US 7,317,558 B2
(45) Date of Patent: Jan. 8, 2008

(54) SYSTEM AND METHOD FOR IMAGE PROCESSING OF MULTIPLE IMAGES

(75) Inventor: Naoki Chiba, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 968 days.

(21) Appl. No.: 10/402,676

(22) Filed: Mar. 28, 2003

(65) Prior Publication Data

US 2003/0184778 A1 Oct. 2, 2003

(30) Foreign Application Priority Data

Mar. 28, 2002 (JP) ............................ 2002-091279

(51) Int. Cl.
H04N 1/387 (2006.01)

(52) U.S. Cl. ..................... 358/450; 345/629; 382/284; 382/282; 382/206; 382/212; 382/213

(58) Field of Classification Search ................ 358/450; 345/629; 382/284, 206, 212, 213, 282
See application file for complete search history.

(56) References Cited

U.S. PATENT DOCUMENTS

| | | | |
|---|---|---|---|
| 5,649,032 A | 7/1997 | Burt et al. | 382/284 |
| 5,706,416 A | 1/1998 | Mann et al. | 395/127 |
| 6,097,854 A | 8/2000 | Szeliski et al. | 382/284 |
| 6,249,616 B1* | 6/2001 | Hashimoto | 382/284 |
| 6,549,651 B2* | 4/2003 | Xiong et al. | 382/154 |
| 6,606,404 B1* | 8/2003 | Zhang et al. | 382/154 |
| 6,608,923 B1* | 8/2003 | Zhang et al. | 382/154 |
| 6,985,638 B1* | 1/2006 | Aoki | 382/284 |
| 7,095,905 B1* | 8/2006 | Peterson | 382/284 |
| 2002/0018589 A1* | 2/2002 | Beuker et al. | 382/132 |
| 2003/0058945 A1* | 3/2003 | Chiba et al. | 375/240.16 |

FOREIGN PATENT DOCUMENTS

| | | |
|---|---|---|
| JP | 11-339021 | 12/1999 |
| JP | 2001-057652 A | 2/2001 |
| JP | 2001-134751 A | 5/2001 |
| JP | 2001-177716 A | 6/2001 |

OTHER PUBLICATIONS

U. S. Patent Application Publication No. US 2003/0058945 A1; Pub-lished Mar. 27, 2003; Naoki Chiba et al.; Filed May 21, 1998.
"*Image Mosaicing for Tele-Reality*", Richard Szeliski, May 1994, Digital Equipment Corporation; Cambridge Research Laboratory Technical Report Series.
English language abstract of reference CA from http://64.233.179.104/translate_c ?hl=en&u=http://ci.nii.ac.jp/naid/110003183528/en/&prev=/search%3Fq%3DNaoki%2BCHIBA,%2BHiroshi%2BKANO,%2BMichihiko%2BMINOH,%2Band%2BMasashi%2BYASUDA;526hl53Den; last visited Jun. 25, 2007.

* cited by examiner

*Primary Examiner*—Twyler Lamb
*Assistant Examiner*—Jacky X. Zheng
(74) *Attorney, Agent, or Firm*—Darby & Darby

(57) ABSTRACT

A plurality of images are read in, two line segments which need be inherently parallel with each other in each of the images are designated, and a planar projective transform matrix is obtained from coordinates of end points of the line segments for parallelizing the line segments, thereby executing height normalization. Subsequently, totally four sets of corresponding points are obtained among three sequential images at regions where adjacent two images are overlapped, and matrix elements of planar projective transform matrix is obtained from the obtained corresponding points to calculate an stitch coefficient. Image stitching is executed by using the stitch coefficient. In stitching a plurality of images for stitching, it is possible to accurately stitch the images after the height is normalized among the images.

14 Claims, 9 Drawing Sheets

HEIGHT NORMALIZATION

PLANAR PROJECTIVE TRANSFORMATION
BETWEEN THREE IMAGES

LOCAL REGISTRATION

SYSTEM AND METHOD FOR IMAGE PROCESSING OF MULTIPLE IMAGES

BACKGROUND OF THE INVENTION

1. Field of the Invention

The present invention relates to an image processing method and an image processing apparatus for making a panoramic mosaic image by stitching a plurality of images, a computer program product for realizing the image processing apparatus and a computer memory product storing the computer program.

2. Description of Related Art

To bequeath cultural heritages, arts and craftworks to posterity, work for digitizing images acquired with a camera is ongoing. Instead of recording the digitized images simply as two-dimensional images, in the case of a craftwork of a three-dimensional configuration such as a statue of Buddha or a sculpture for example, recording is performed as a three-dimensional image which is formed by digitizing images acquired in a plurality of directions and performing image-processing with respect to the plural two-dimensional images.

Further, to record a horizontally elongate image which is an object to be acquired such as a Japanese picture scroll as a two-dimensional digital image, the acquisition of images is performed divisionally with a plurality of cameras. Therefore, it is necessary to digitize the divisionally acquired images and seamlessly stitch the images by image processing.

On the other hand, with the increasing use of digital cameras, techniques (image mosaicking) for forming an image having a wide field of view and high resolution are actively studied. For example, a panoramic mosaic image may be formed by calculating geometric transformation such as two-dimensional rigid body transformation or affine transformation between two images and stitching the images utilizing the calculated geometric transformation. Similarly, when three or more images exist, geometric transformation between two images is first calculated to form a panoramic mosaic image, and then geometric transformation between the panoramic mosaic image and an image to be stitched with the panoramic mosaic image is calculated to perform image stitching. In this way, geometric transformation is calculated successively between a panoramic mosaic image and an image to be stitched therewith for performing image stitching.

However, in the case of a Japanese picture scroll, image stitching cannot be accurately performed when the above-described rigid body transformation or affine transformation is simply used. The reason lies in the condition of the acquisition of the images. Since a Japanese picture scroll is very long, it is difficult to acquire the image with the scroll entirely spread, and therefore, the image is acquired divisionally with respect to a number of regions. At that time, when the image which is an object to be acquired is sufficiently far away from the camera or when an image is acquired with a telephoto lens of a very long focal distance, the problem can be simplified because the image thus acquired can be assumed to be an image of parallel projection. Actually, however, acquisition of images cannot help being performed from a limited distance, so that the obtained image generally includes perspective projection distortion.

Moreover, having been formed around the 16th century, Japanese picture scrolls are very old, so that care need be taken in its handling and repetitive acquisition of image is often difficult. Therefore, it is often necessary to use acquired images in the past.

Generally, an image acquired under the above-described conditions cannot be assumed to be an image of parallel projection and includes perspective projection distortion. Therefore, when geometric transformation such as the rigid body transformation or the affine transformation, which does not give careful consideration to perspective projection distortion, is used, a properly stitched image cannot be obtained.

Therefore, planar projective transformation is utilized as a method which gives consideration to perspective projection distortion. FIG. 1 is a schematic diagram illustrating images stitched by planar projective transformation. In performing image stitching by planar projective transformation, similarly to the above, planar projective transformation between two images (image 1 and image 2) is first calculated to form a panoramic mosaic image. Subsequently, planar projective transformation between the panoramic mosaic image (which is the stitched image of image 1 and image 2 in this example) and an image (image 3 in this example) to be stitched with the panoramic mosaic image is calculated to form a panoramic mosaic image. Then, planar projective transformation between the panoramic mosaic image and an image to be stitched therewith is calculated. In this way, image stitching is performed successively.

Although the planar projective transformation can remove perspective projection distortion which cannot be removed by such geometric transformation as the rigid body transformation or the affine transformation, the resulting panoramic mosaic image becomes like one acquired from a certain viewpoint using a wide-angle lens. Specifically, as shown in FIG. 1, the distortion is little in an image 1 located at the point of regard but gradually increases as an image becomes farther away from the image 1.

Further, acquired images often have different scales, and even when such images are stitched together, it is desirable that the picture, or painting in the stitched image has a constant height and that an upper and a lower boundaries of the picture extend substantially parallel with each other from one end to the other end. Since such image stitching for a Japanese picture scroll is difficult by a conventional method, there is a demand for development of an image processing method which is capable of accurately forming a panoramic mosaic image so that the height of the picture becomes constant.

BRIEF SUMMARY OF THE INVENTION

The present invention is designed under the circumstances described above, and an object of the invention is to provide an image processing method and an image processing apparatus which are capable of accurately stitching images while matching the scales of the images by accepting input of a first image, a second image including a region to be overlapped with the first image, and a third image including a region to be overlapped with the second image, matching scales of the inputted images to each other, obtaining a plurality of corresponding points corresponding between the images which match each other in scale, executing planar projective transformation of the second image utilizing a planar projective transform matrix among the images calculated based on the obtained corresponding points between the images and stitching the second image after the planar projective transformation with the first and the third images. The invention also aims to provide a computer program product for realizing such an image processing apparatus, and a computer memory product storing the computer program.

Another object of the present invention is to provide an image processing method and an image processing apparatus which are capable of easily matching scales of images by designating two line segments to be parallel with each other in each of the images and calculating a planar projective transform matrix based on coordinates of end points of the two line segments for parallelizing the two line segments.

Still another object of the present invention is to provide an image processing method and an image processing apparatus which are capable of executing not only global geometric transformation of an image but also local registration by densely obtaining positional relationship of corresponding pixels between images and stitching images based on the obtained positional relationship.

An image processing method according to a first aspect is a method for stitching a plurality of images including regions which are to be overlapped with each other at the regions to form a single image, comprising steps of accepting input of a first image, a second image including a region to be overlapped with the first image, and a third image including a region to be overlapped with the second image; matching scales of the inputted images to each other; obtaining a plurality of corresponding points corresponding between the first image and the second image which match each other in scale; obtaining a plurality of corresponding points corresponding between the second image and the third image which match each other in scale; calculating a planar projective transform matrix indicating geometric relationship among the first through the third images based on the obtained corresponding points between respective images; executing planar projective transformation of the second image based on the calculated planar projective transform matrix; and stitching the second image after the planar projective transformation with the first and the third images.

An image processing method according to a second aspect is characterized by that, in the image processing method according to the first aspect, the step of stitching the second image after the planar projective transformation with the first and the third images further comprising steps of densely obtaining positional relationship between pixels in the second image and corresponding pixels in the first and the third images with respect to the pixels in respective overlap regions; and stitching the images based on the obtained positional relationship.

An image processing method according to a third aspect is characterized by that, in the image processing method according to the first aspect or the second aspect, the step of stitching the second image after the planar projective transformation with the first and the third images further comprising steps of densely obtaining positional relationship between pixels in the second image and corresponding pixels in the first and the third images with respect to pixels in respective overlap regions; and stitching the images based on the obtained positional relationship.

An image processing method according to a fourth aspect is a method for matching scales of a plurality of images to each other, comprising steps of accepting input of a plurality of images; designating two line segments which are to be parallel with each other in each of the images; calculating a planar projective transform matrix based on coordinates of end points of the two designated line segments for parallelizing the two line segments; and executing planar projective transformation of the images based on the calculated planar projective transform matrix.

An image processing apparatus according to a fifth aspect is an image processing apparatus for stitching a plurality of images including regions which are to be overlapped with each other at the regions to form a single image, comprising: accepting means for accepting input of a first image, a second image including a region to be overlapped with the first image, and a third image including a region to be overlapped with the second image; scale matching means for matching scales of the images inputted from the image accepting means to each other; first corresponding point extracting means for obtaining a plurality of corresponding points corresponding between the first image and the second image which match each other in scale; second corresponding point extracting means for obtaining a plurality of corresponding points corresponding between the second image and the third image which match each other in scale; calculating means for calculating a planar projective transform matrix indicating geometric relationship among the first through the third images based on the corresponding points obtained by the first and the second corresponding point extracting means; image transforming means for executing planar projective transformation of the second image based on the calculated planar projective transform matrix; and image stitching means for stitching the second image after the planar projective transformation with the first and the third images.

Also, an image processing apparatus according to a fifth aspect is an image processing apparatus for stitching a plurality of images including regions which are to be overlapped with each other at the regions to form a single image, comprising processor capable of performing operations of accepting input of a first image, a second image including a region to be overlapped with the first image, and a third image including a region to be overlapped with the second image; matching scales of the inputted images to each other; obtaining a plurality of corresponding points corresponding between the first image and the second image which match each other in scale; obtaining a plurality of corresponding points corresponding between the second image and the third image which match each other in scale; calculating a planar projective transform matrix indicating geometric relationship among the first through the third images based on the obtained corresponding points; executing planar projective transformation of the second image based on the calculated planar projective transform matrix; and stitching the second image after the planar projective transformation with the first and the third images.

An image processing apparatus according to a sixth aspect is characterized by that, in the image processing apparatus according to the fifth aspect, the scale matching means comprising: means for accepting designation of two line segments which are to be parallel with each other in each of the images; means for calculating a planar projective transform matrix based on coordinates of end points of the two designated line segments for parallelizing the two line segments; and means for executing planar projective transformation of the images based on the calculated planar projective transform matrix.

Also an image processing apparatus according to a sixth aspect is characterized by that, in the image processing apparatus according to the fifth aspect, in stitching the second image with the first and the third images, the operation of stitching images densely obtains positional relationship between pixels in the second image and corresponding pixels in the first and the third images with respect to pixels in respective overlap regions, and stitches the images based on the obtained positional relationship.

An image processing apparatus according to a seventh aspect is characterized by that, in the image processing apparatus according to the fifth aspect or the sixth aspect, in stitching the second image with the first and the third images, the image stitching means densely obtains positional relationship between pixels in the second image and corresponding pixels in the first and the third images with respect to pixels in respective overlap regions, and stitches the images based on the obtained positional relationship.

Also an image processing apparatus according to a seventh aspect is characterized by that, in the image processing apparatus according to the fifth aspect or the sixth aspect, in stitching the second image with the first and the third images, the operation of stitching images densely obtains positional relationship between pixels in the second image and corresponding pixels in the first and the third images with respect to pixels in respective overlap regions, and stitches the images based on the obtained positional relationship.

An image processing apparatus according to an eighth aspect is an image processing apparatus for matching scales of a plurality of images to each other, comprising: means for accepting input of a plurality of images; means for accepting designation of two line segments which are to be parallel with each other in each of the images; means for calculating a planar projective transform matrix based on coordinates of end points of the two designated line segments for parallelizing the two line segments; and means for executing planar projective transformation of the images based on the calculated planar projective transform matrix.

Also an image processing apparatus according to an eighth aspect is an image processing apparatus for matching scales of a plurality of images to each other, comprising processor capable of performing operations of accepting input of a plurality of images; accepting designation of two line segments which are to be parallel with each other in each of the images; calculating a planar projective transform matrix based on coordinates of end points of the two designated line segments for parallelizing the two line segments; and executing planar projective transformation of the images based on the calculated planar projective transform matrix.

A computer program product according to a ninth aspect is a computer program product within a computer readable medium for causing a computer to stitch a plurality of images including regions which are to be overlapped with each other at the regions to form a single image, comprising instruction within the medium for: causing the computer to match scales of inputted images to each other which include a first image, a second image including a region to be overlapped with the first image and a third image including a region to be overlapped with the second image; causing the computer to obtain a plurality of corresponding points corresponding between the first image and the second image which match each other in scale; causing the computer to obtain a plurality of corresponding points corresponding between the second image and the third image which match each other in scale; causing the computer to calculate a planar projective transform matrix indicating geometric relationship among the first through the third images based on the obtained corresponding points between respective images; causing the computer to execute planar projective transformation of the second image based on the calculated planar projective transform matrix; and causing the computer to stitch the second image after the planar projective transformation with the first and the third images.

A computer memory product according to a tenth aspect is a computer memory product for causing a computer to stitch a plurality of images including regions which are to be overlapped with each other at the regions to form a single image, readable by a computer, containing a program, the computer program comprising steps of: causing the computer to match scales of inputted images to each other which include a first image, a second image including a region to be overlapped with the first image and a third image including a region to be overlapped with the second image; causing the computer to obtain a plurality of corresponding points corresponding between the first image and the second image which match each other in scale; causing the computer to obtain a plurality of corresponding points corresponding between the second image and the third image which match each other in scale; causing the computer to calculate a planar projective transform matrix indicating geometric relationship among the first through the third images based on the obtained corresponding points between respective images; causing the computer to execute planar projective transformation of the second image based on the calculated planar projective transform matrix; and causing the computer to stitch the second image after the planar projective transformation with the first and the third images.

In the first aspect, the fifth aspect, the ninth aspect and the tenth aspect, input of a first image, a second image including a region to be overlapped with the first image and a third image including a region to be overlapped with the second image is accepted, scales of the inputted images are matched to each other, a plurality of corresponding points corresponding between the images which match each other in scale are obtained, a planar projective transform matrix indicating geometric relationship among the first through the third images is calculated based on the corresponding points obtained between respective images, planar projective transformation of the second image is executed utilizing the calculated planar projective transform matrix, and the second image after the planar projective transformation is stitched with the first and the third images. Even when a plurality of acquired images have different scales and each of the images includes perspective projection distortion, it is possible to stitch the images while matching the scales of the images to each other and avoiding such a situation that the distortion increases every time the planar projective transformation is executed.

In the second aspect and the sixth aspect, in matching the scales of the images to each other, two line segments to be parallel with each other in each of the images are designated and a planar projective transformation is calculated by utilizing coordinates of end points of each designated line segment for parallelizing the two line segments, thereby executing image stitching. Therefore, in stitching images of a Japanese picture scroll, it is possible to easily normalize the height of the picture by utilizing the upper and the lower boundaries of the picture.

In the third aspect and the seventh aspect, positional relationship between pixels in the second image and corresponding pixels in the first and the third images are densely obtained with respect to pixels in respective overlap regions and image stitching is executed based on the obtained positional relationship. Therefore, in addition to the global geometric transformation, local registration is possible.

In the fourth aspect and the eighth aspect, in matching the scales of the images to each other, two line segments to be parallel with each other in each of the images are designated and a planar projective transformation is calculated by utilizing coordinates of end points of each designated line segment for parallelizing the two line segments, thereby executing image stitching. Therefore, in stitching images of a Japanese picture scroll, it is possible to easily normalize the height of the picture by utilizing the upper and the lower boundaries of the picture.

The above and further objects and features of the invention will more fully be apparent from the following detailed description with accompanying drawings.

BRIEF DESCRIPTION OF THE SEVERAL VIEW OF THE DRAWINGS

DETAILED DESCRIPTION OF THE PREFERRED EMBODIMENTS

The present invention will be described below in detail with reference to the drawings illustrating the embodiment.

Figure 1:
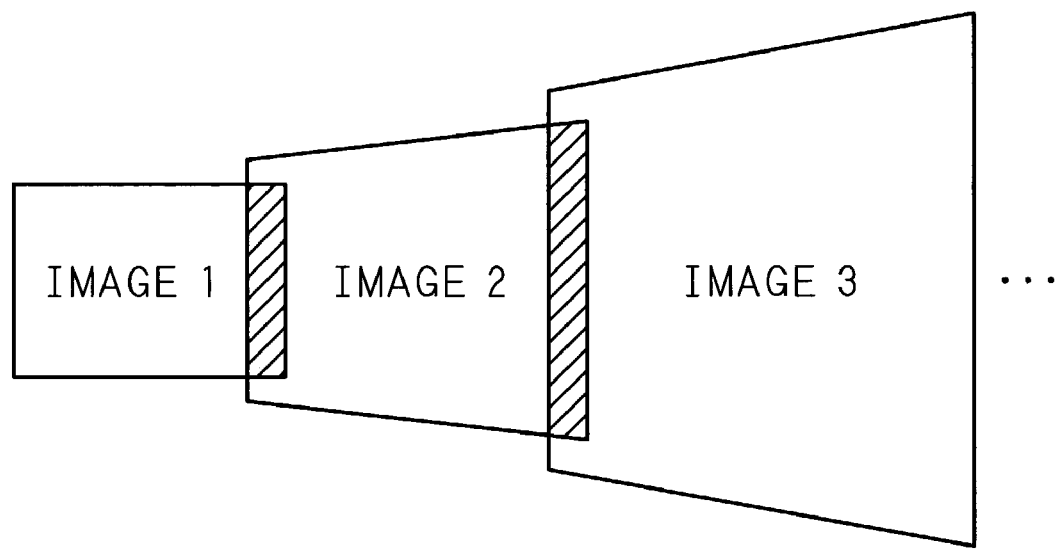
FIG. 1 is a schematic diagram illustrating images stitched by planar projective transformation.
Figure 2:
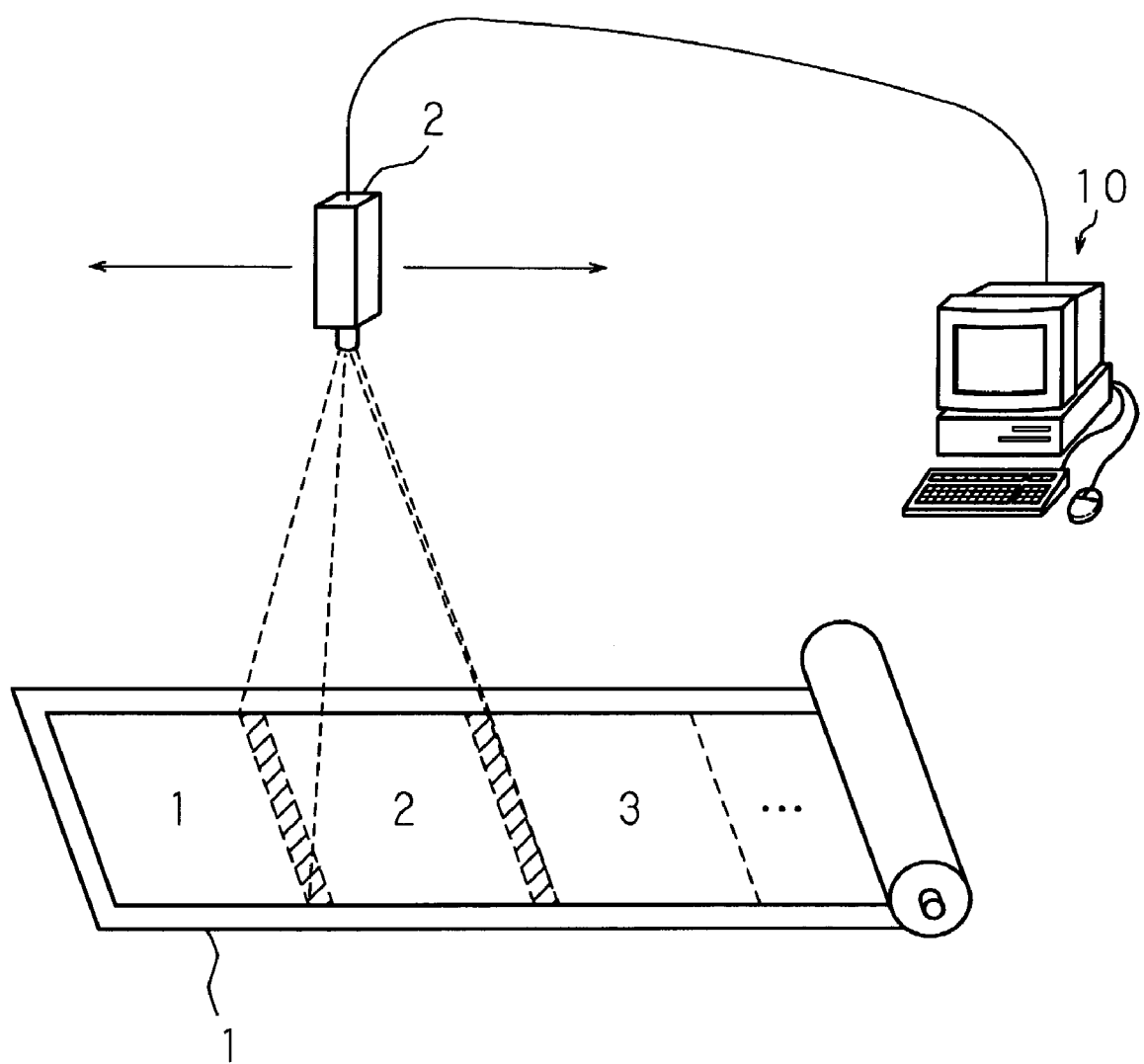
FIG. 2 is a schematic diagram illustrating an image processing apparatus according to the present invention.

FIG. 2 is a schematic diagram illustrating an image processing apparatus according to the present invention. The reference numeral 10 indicates the image processing apparatus of the present invention, which is specifically a general-purpose computer such as a personal computer or a workstation. In the present invention, the image 1 of an object to be acquired which is horizontally elongate such as a Japanese picture scroll is acquired using an image-pick up device 2 such as a camera using a film or a digital camera. The acquisition of images is performed divisionally with respect to different regions of the scroll so that each of the images thus acquired includes an overlap region with another. The acquired images are read in the image processing apparatus 10 as image data, and the read images are stitched to form a panoramic mosaic image.

Figure 3:
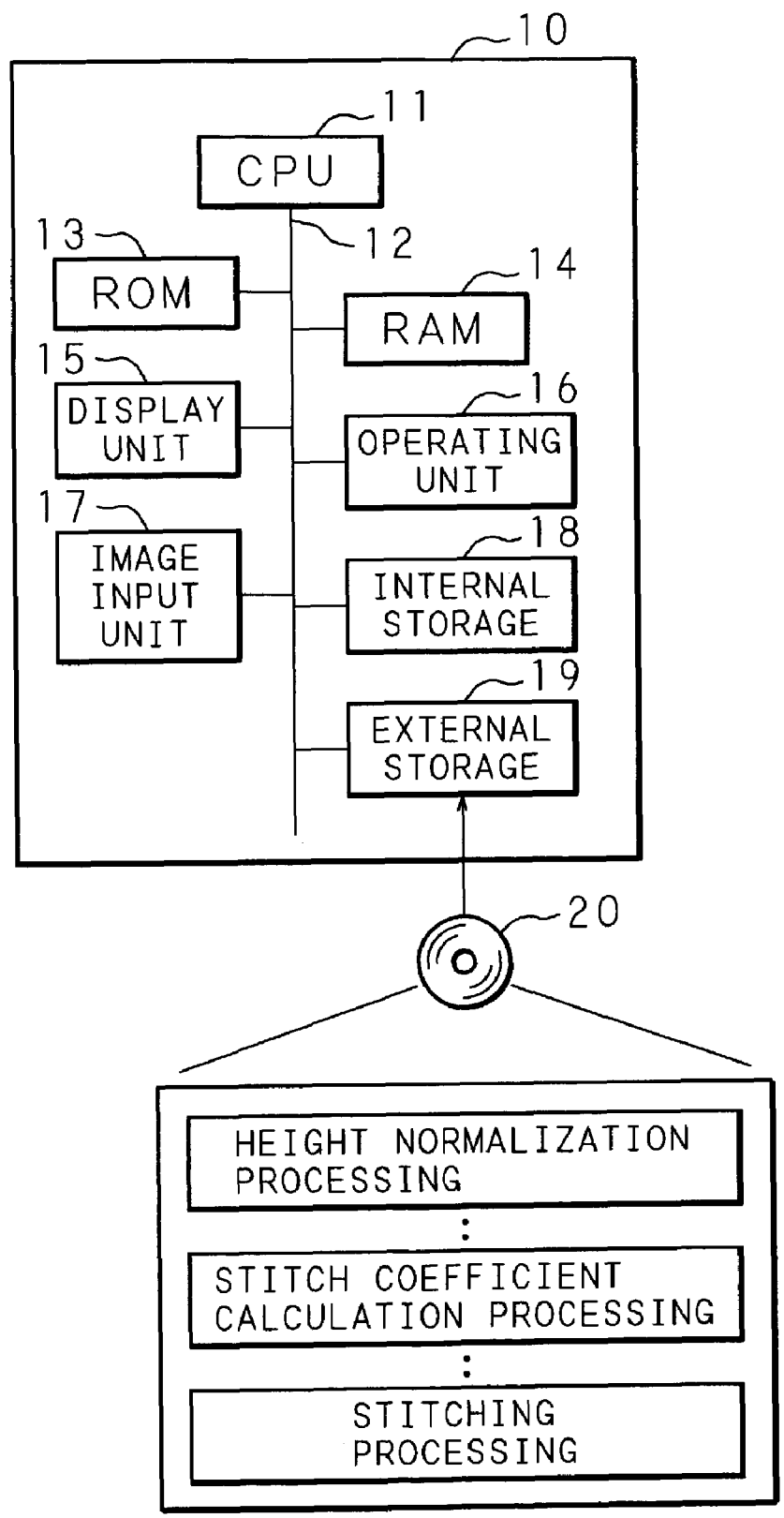
FIG. 3 is a block diagram illustrating the internal configuration of the image processing apparatus according to the present invention.

FIG. 3 is a block diagram illustrating the internal configuration of the image processing apparatus 10 of the present invention. The image processing apparatus 10 is provided with a CPU 11. The CPU 11 is connected to each of hardware units such as a ROM 13, a RAM 14, a display unit 15, an operating unit 16, an image input unit 17, an internal storage 18, an external storage 19 and the like via a bus 12 and controls the operation of them in accordance with a control program stored in the ROM 13.

The RAM 14 comprises an SRAM, a flash memory or the like and temporarily stores data generated in executing a control program stored in the ROM 13, image data to be processed and the like.

The display unit 15 is provided with a CRT display or a liquid crystal display and displays an image before the image processing, a panoramic mosaic image formed by the image processing, instructions from a computer program product of the present invention and the like.

The operating unit 16 comprises input devices such as a keyboard or a mouse and executes inputting of necessary information or selecting operation or the like in accordance with the instructions from the above-described computer program.

The image input unit 17 may be a scanner device, a film scanner or the like as an optical image reading apparatus and inputs an image of a silver halide photograph, photographic film or the like for conversion to digital data. Instead of inputting image data using the image input unit 17, image may be inputted utilizing a portable memory storing image data acquired by a digital camera and using an appropriate reading apparatus. The image data thus inputted is stored in the internal storage 18.

The internal storage 18 is a storage device such as a hard disk. In addition to the above-described image data, the internal storage stores the computer program of the present invention installed therein. When the computer program is started up, a predetermined portion of the computer program is loaded into the RAM 14, and by executing processing by the CPU 11, a general-purpose computer operates as the image processing apparatus 10 of the present invention.

The external storage 19 comprises a CD-ROM drive or the like for reading the computer program and data from a recording medium 20 such as a CD-ROM storing the computer program of the invention and data. The computer program of the invention and data thus read out are stored in the internal storage 18.

In the image processing apparatus 10 of the present invention, image data is inputted from the image input unit 17, the CPU 11 executes the above-mentioned computer program to form a panoramic image, and the result is displayed on the display unit 15 while being stored in the internal storage 18.

Figure 4A:
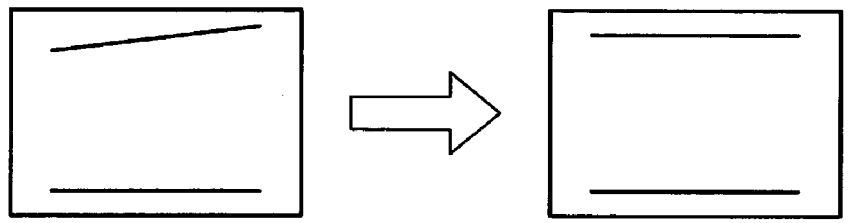
FIG. 4A, FIG. 4B and FIG. 4C are schematic diagrams illustrating the processing procedure of an image processing method of the present invention.
Figure 4B:
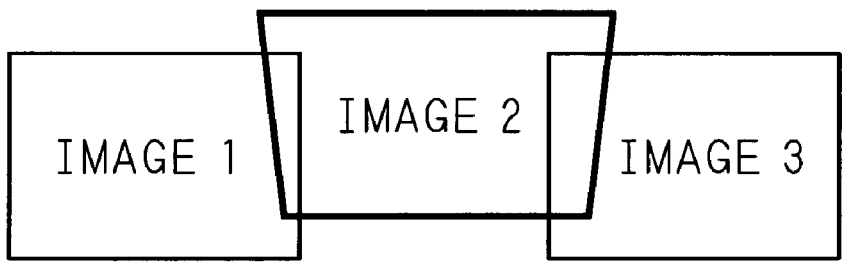
Figure 4C:
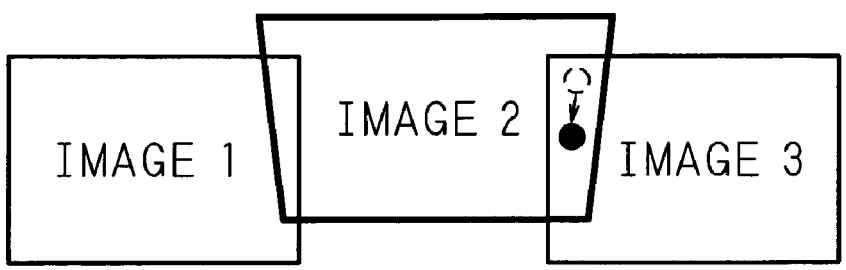

FIG. 4A, FIG. 4B and FIG. 4C are schematic diagrams illustrating the processing procedure of the image processing method of the present invention. According to the present invention, to make respective scales of images divisionally acquired match each other, the height of the picture in each image is normalized in advance (FIG. 4A). In acquisition of image, an acquisition object 1 such as a Japanese picture scroll, the image-pick up device 2 is so set as to accurately face the acquisition object 1. Actually, however, such facing cannot be realized perfectly, so that the acquired images include perspective projection distortion. Therefore, upper and lower boundaries of the picture or painting, which need be inherently parallel with each other, are not parallel in the image. Further, the images divisionally acquired differ from each other in scale.

Therefore, utilizing the fact that the upper and lower boundaries of the picture are substantially parallel with each other and constant, normalization is performed in advance so that the upper and lower boundaries in each image become parallel with each other and the height of the picture becomes constant in all the images.

Subsequently, after the height of the picture is normalized, stitching of images are performed (FIG. 4B). When planar projective transformation is performed between two images, the images are properly stitched at the overlap region. However, by repeating such stitching, distortion accumulates little by little, so that the image which is stitched last may be distorted extremely. Therefore, in the present invention, planar projective transformation is performed among three images. At that time, the perspective projection distortion which has not been removed by the above-described height normalization is also removed.

Finally, in addition to the global geometric transformation, local registration is performed (FIG. 4C). Although the picture scroll is drawn in a planar surface, it is often deformed three-dimensionally due to the expansion and contraction of the paper for years and warping of the paper or the like. The local registration is performed to cope with such deformation.

Figure 5:
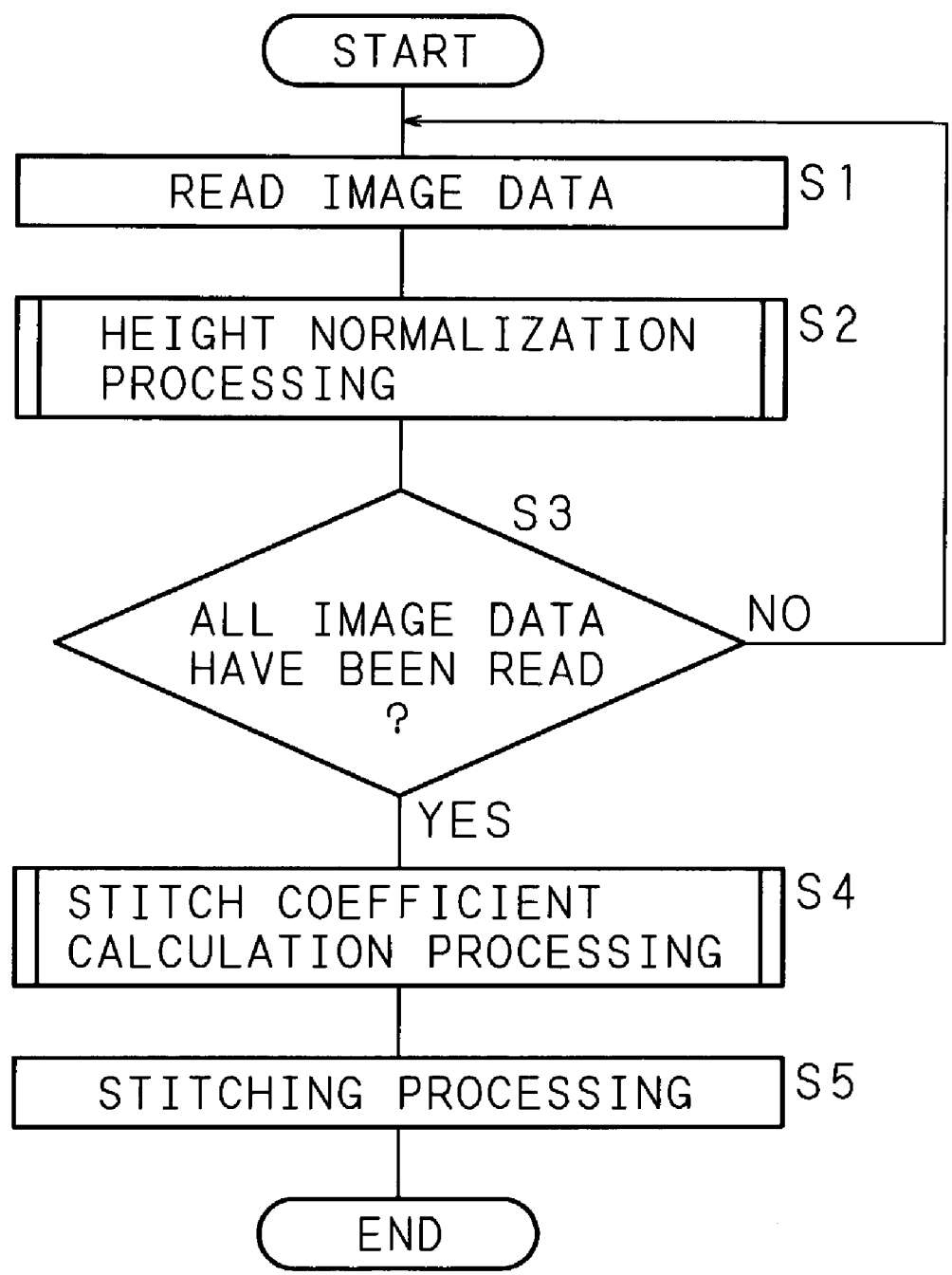
FIG. 5 is a flow chart showing the processing procedure of the image processing apparatus.

FIG. 5 is a flow chart showing the processing procedure by the CPU 11 of the image processing apparatus 10. Firstly, the CPU 11 reads image data to be subjected to the image processing (Step S1). As the read image data, image data may be read from the image input unit 17 or image data in advance stored in the internal storage 18 may be read. The image data thus read is temporarily stored in the RAM 14.

Then, the CPU 11 executes normalization processing for height (Step S2), which will be described later, and judges whether or not all image data to be read have been read (Step S3). When image data to be read still remains (Step S3: NO), the process returns to Step S1 where the CPU 11 excites image reading again.

When all image data are read (Step S3: YES), the CPU 11 executes calculation of stitch coefficient (Step S4), which will be described later. Herein, the stitch coefficient means matrix elements of planar projective transform matrix and an amount of movement of each pixel, which are necessary for stitching three images.

After the stitch coefficient is calculated, the CPU 11 executes stitching processing by using the calculated stitch coefficient (Step S5).

The above-mentioned height normalization processing and stitch coefficient calculation processing need not necessarily be executed by single application software (computer program). Alternatively, the height normalization processing and the stitch coefficient calculation processing may be executed by individual application software.

Figure 6:
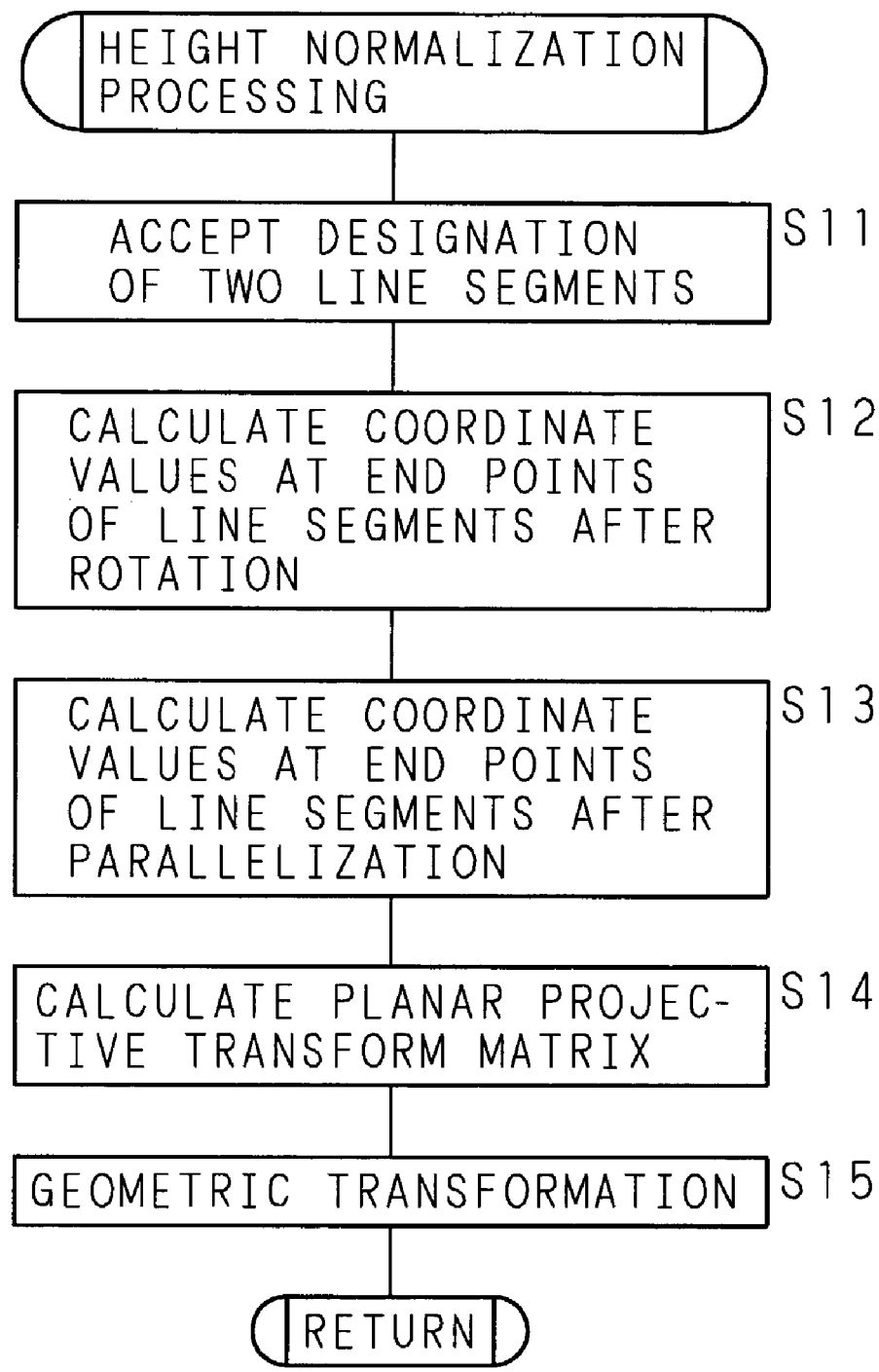
FIG. 6 is a flow chart showing the processing procedure of height normalization processing.

FIG. 6 is a flow chart showing the processing procedure of the height normalization processing of Step S2 by the CPU 11. As described above, in the height normalization processing, the CPU 11 accepts designation of two line segments in each image which need be inherently parallel with each other (Step S11). To execute the processing reliably and accurately, a GUI (graphical user interface) is prepared in advance for manually designating line segments. For example, each line segment can be designated by pointing both end points of each line segment with a pointing device such as a mouse, tablet or the like.

Subsequently, the CPU 11 calculates coordinate values at the end points of the line segments after rotation (Step S12). In calculating the coordinate values of the end points after rotation, the CPU 11 first calculates, from the line segments, the angle of rotation about the optical axis. Utilizing a rotation matrix R which uses the calculated rotation angle, the coordinate values are obtained by the following equation.

$$p' = Rp$$

Where p is a coordinate before rotation, and p' is a coordinate after rotation. The angle of rotation about the optical axis may be calculated from the inclination of the upper line segment, for example.

Then, the CPU 11 calculates coordinate values at the end points of the line segments after parallelization (Step S13). To parallelize the two line segments, transformation is considered which equalize the vertical coordinates of both end points of each of the line segments. This is realized by setting the vertical coordinates of the end points after transformation to an average value of the vertical coordinates before transformation. That is, the coordinates (u, v) of the end point after transformation are expressed by the following equation using vertical coordinates v1, v2 before transformation.

$$(u, v) = (u, (v1+v2)/2)$$

Subsequently, the distance between the upper and the lower line segments is designated. When the vertical coordinate of the lower line segment is represented by vL, the coordinates of the upper line segment is expressed by the following equation using the distance d between the line segments.

$$(u, v) = (u, vL+d)$$

By designating the distance d between the line segments enables actual-size printing.

Utilizing four sets of coordinates before transformation and after transformation of the two line segments calculated in Step S12 and Step 13, the CPU 11 calculates a planar projective transform matrix (Step S14). Then, the CPU 11 executes geometric transformation of each image utilizing the calculated planar projective transform matrix (Step S15).

By the geometric transformation as described above, images are provided from which rotation has been removed and which have a designated picture height.

Figure 7:
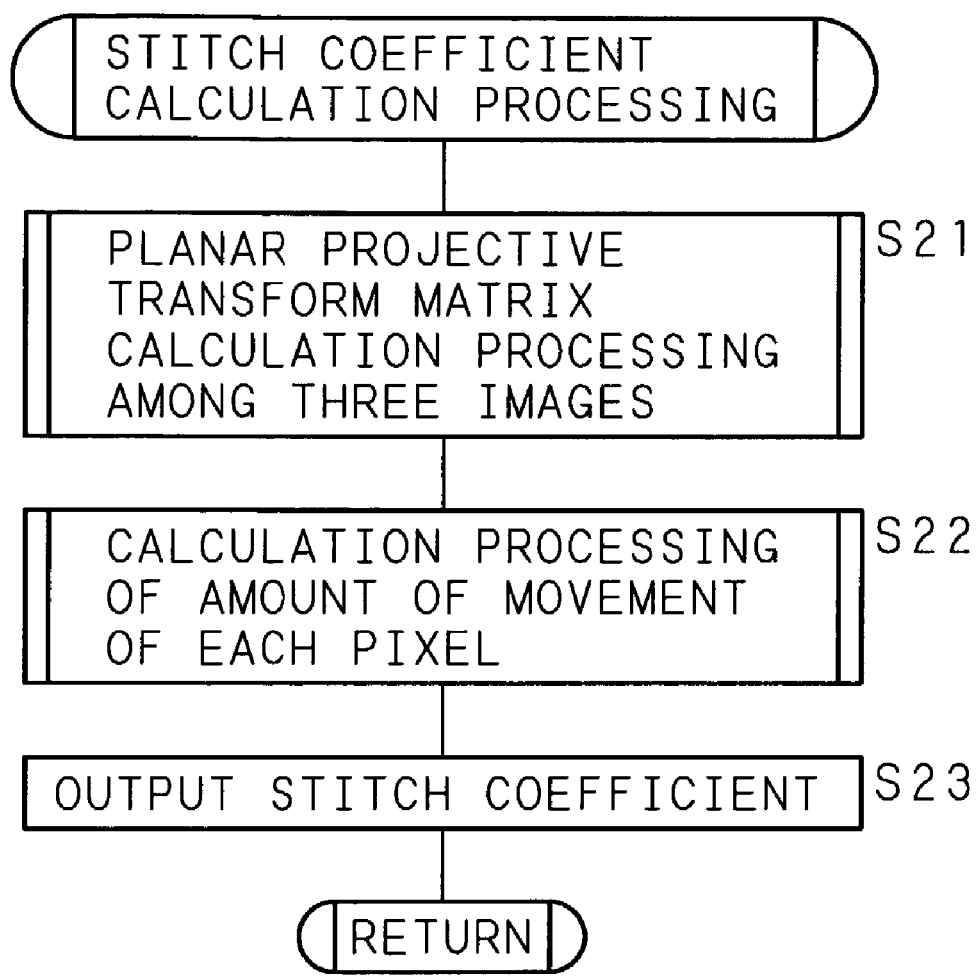
FIG. 7 is a flow chart showing the processing procedure of stitch coefficient calculation processing in the flow chart of FIG. 5.

FIG. 7 is a flow chart showing the processing procedure of the calculation of a stitch coefficient of Step S4 in the flow chart of FIG. 5 by the CPU 11.

Firstly, the CPU 11 calculates a planar projective transform matrix among the three images utilizing the images from which rotation has been removed and which have the designated picture height (Step S21). Although each of the images is normalized, the picture is doubled at the overlap region by the simple geometric transformation such as translation and the accuracy is not sufficient. Moreover, when the planar projective transformation between two adjacent images is successively repeated, difference occurs in the picture height because the degree of freedom of the transformation is high.

Therefore, the present invention employs planar projective transformation among three images. In this case, as shown in FIG. FIG. 4A, FIG. 4B and FIG. 4C, the center image (image 2) of three sequential images is subjected to the geometric transformation. At that time, although the perspective projection distortion in the vertical direction of the image has been already removed by the height normalization, the distortion of the image in the horizontal direction still remains. Therefore, simple translation cannot make it possible to properly stitch the center image (image 2) with the left and right images (image 1 and image 3). Therefore, a planar projective transform matrix to deform the center image is calculated.

Subsequently, the CPU 11 calculates the amount of movement of each pixel (Step S22). Since the Japanese picture scroll as the acquisition object 1 was made several hundred yeas ago for example, the paper thereof includes expansion or contraction due to the deterioration for years. Moreover, since the picture scroll is fragile, it cannot be made perfectly flat at acquisition of the images. For this reason, good stitching of images cannot be realized just by the above-described geometric transformation. Therefore, in addition to the global geometric transformation, local registration is performed.

Then, the CPU 11 outputs the matrix elements of the planar projective transform matrix calculated in Step S21 and the amount of movement of each pixel calculated in Step S22 as the stitch coefficient (Step S23).

Figure 8:
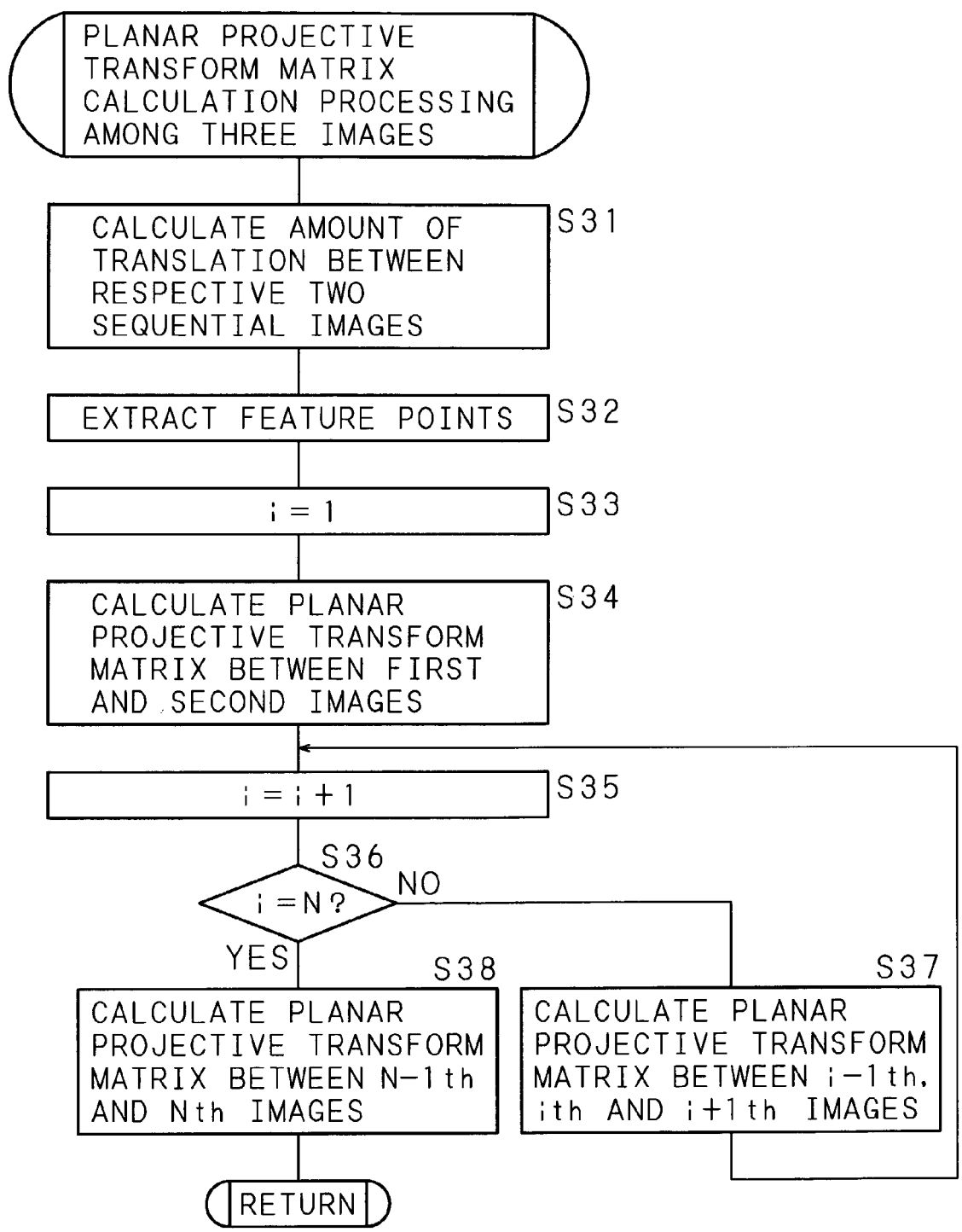
FIG. 8 is a flow chart showing the processing procedure of calculation of a planar projective transform matrix among three images in the flow chart of FIG. 7.

FIG. 8 is a flow chart showing the processing procedure of the calculation of a planar projective transform matrix among three images of Step S21 in the flow chart of FIG. 7 by the CPU 11.

First, the CPU 11 calculates the amount of translation between respective two sequential images (Step S31), and extracts feature points at the overlap region of the adjacent images for finding correspondence (Step S32).

In calculating the planar projective transform matrix among three images, at least four sets of corresponding points are found among the three images. Accordingly, coordinates of two sets of corresponding points are found between each pair of adjacent images so that totally four sets of corresponding points are found. The correspondence of the feature points between the images can be automatically figured out by using flow estimation, for example. When the feature points cannot be automatically calculated, the points may be manually added by a GUI.

When more than four sets of corresponding points are found, matrix elements of planar projective transform matrix may be calculated by the least-squares method.

Subsequently, the CPU 11 sets a counter i=1 (Step S33), and calculates a planar projective transform matrix between the first and the second images (Step S34).

Then, the CPU 11 increases the counter value i by one (Step S35) and judges whether or not i=N (Step S36). Herein, N is the total number of images to be stitched.

When i=N does not hold (Step S36: NO), the CPU 11 calculates a planar projective transform matrix among the (i−1)th, i th and (i+1)th images (Step S37). When i=N in Step S36 (Step S36: YES), the CPU 11 calculates a planar projective transform matrix between the (N−1)th and N th images (Step S38).

Figure 9:
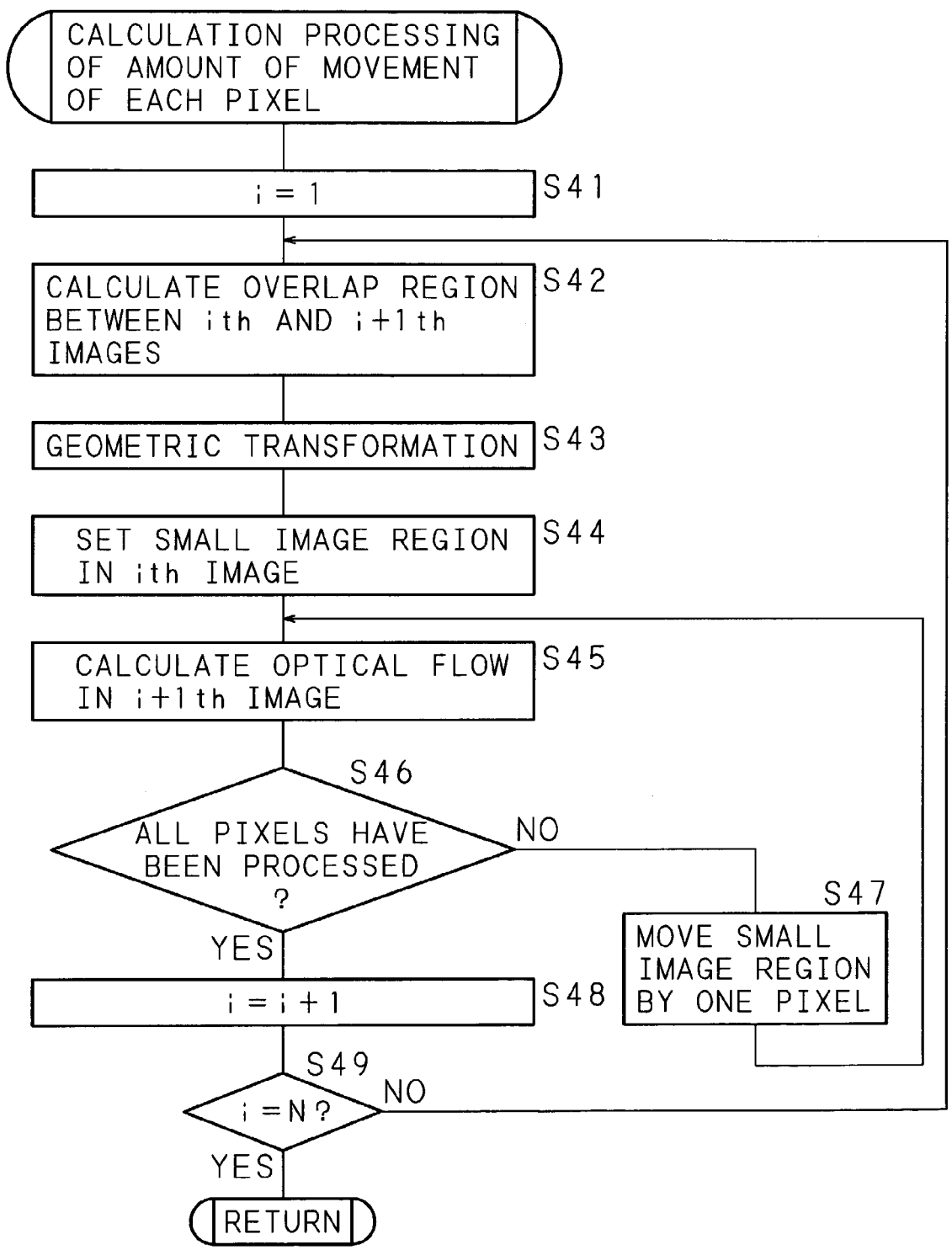
FIG. 9 is a flow chart showing the processing procedure of calculation of the amount of movement of each pixel in the flow chart of FIG. 7.

FIG. 9 is a flow chart showing the processing procedure of the calculation of the amount of movement of each pixel of Step S22 in the flow chart of FIG. 7 by the CPU 11.

First, the CPU 11 sets a counter i=1 (Step S41) and calculates the overlap region between the i th image and the (i+1)th image (Step S42). Then, the CPU 11 executes geometric transformation with respect to each of the images at the overlap region (Step S43).

Then, the CPU 11 sets a small image region in the overlap region of the i th image after the geometric conversion (Step S44). Herein, as the small image region, a rectangular image region of about 13×13 pixels is set. Then, the CPU 11 calculates an optical flow in the (i+1)th image at a region corresponding to the set small image region (Step S45). At that time, the CPU 11 does not calculate the amount of movement with respect to each small image region but executes flow estimation for each pixel. For the flow estimation, the Lucas-Kanade method, which executes processing at high speed, may be utilized.

Then, the CPU 11 judges whether or not all pixels in the overlap region have been processed (Step S46). When any unprocessed pixel remains (Step S46: NO), the CPU 11 moves the small image region by one pixel (Step S47) and returns the process to Step S45.

When all the pixels have been processed in Step S46 (Step S46: YES), the CPU 11 increases the counter value i by one (Step S48) and judges whether or not i=N, that is, whether or not the amount of movement of each pixel has been calculated with respect to every set of adjacent images (Step S49).

When i=N (Step S49: YES), the CPU 11 terminates the process. When i=N does not hold (Step S49: NO), the CPU 11 returns the process to Step S42 and calculates the movement of amount with respect to every overlap region of adjacent images.

The effectiveness of the image processing method of the present invention was studied by the inventors with the following result. The images prepared were those obtained by digitizing a positive film by a film scanner. Each of the images had a size of 10630×6378 pixels, which were acquired as divided into 13 pieces.

In the case of the image processing method of the present invention, the images were stitched accurately through the overall region. Even after printing, any seam was not observed even by full inspection, and the picture height was kept constant.

Moreover, to quantitatively examine the stitching accuracy, an error E was calculated by averaging absolute values of differences of pixel values. The error E can be obtained by the following equation.

$$E=(\Sigma w|I'-I|/W)$$

Where W is the total number of pixels at an overlap region w. In the case of color pixel values, absolute values of differences are averaged with respect to each of the RGB channels. The error E was 20.2 in the case of a conventional method which did not execute local registration, whereas, in the case of the method of the present invention, the error E was 5.4, which was ¼ of that of the conventional method. Thus, it was found that good stitching processing was executed.

In this embodiment, a Japanese picture scroll is used as an example of acquisition object 1. However, the present invention is also applicable to a painting on a folding screen, a painting on a fusuma (Japanese sliding door), a wall painting and the like.

Moreover, in this embodiment, explanation is given of the case where acquisition of the images is performed little by little with respect to a horizontally elongate acquisition object such as a Japanese picture scroll and a plurality of images thus obtained are stitched in a horizontal direction. However, the direction of stitch is not limited to the horizontal direction, and of course, images may be stitched in a vertical direction.

As described above, in the case of the first invention, the fifth invention, the ninth invention and the tenth invention, input of a first image, a second image including a region to be overlapped with the first image and a third image including a region to be overlapped with the second image is accepted, scales of the inputted images are matched to each other, a plurality of corresponding points corresponding between the images which match each other in scale are obtained, a planar projective transform matrix indicating geometric relationship among the first through the third images is calculated based on the corresponding points obtained between respective images, planar projective transformation of the second image is executed utilizing the calculated planar projective transform matrix, and the second image after the planar projective transformation is stitched with the first and the third images. Even when a plurality of acquired images have different scales and each of the images includes perspective projection distortion, it is possible to stitch the images while matching the scales of the images to each other and avoiding such a situation that the distortion increases every time the planar projective transformation is executed.

In the case of the second invention and the sixth invention, in matching the scales of the images to each other, two line segments to be parallel with each other in each of the images are designated and a planar projective transformation is calculated by utilizing coordinates of end points of each designated line segment for parallelizing the two line segments, thereby executing image stitching. Therefore, in stitching images of a Japanese picture scroll, it is possible to easily normalize the height of the picture by utilizing the upper and the lower boundaries of the picture.

In the case of the third invention and the seventh invention, positional relationship between pixels in the second image and corresponding pixels in the first and the third images are densely obtained with respect to pixels in respective overlap regions and image stitching is executed based on the obtained positional relationship. Therefore, in addition to the global geometric transformation, local registration is possible.

In the case of the fourth invention and the eighth invention, in matching the scales of the images to each other, two line segments which are to be parallel with each other in each of the images are designated and a planar projective transformation is calculated by utilizing coordinates of end points of each designated line segment for parallelizing the two line segments, thereby executing image stitching. Therefore, in stitching images of a Japanese picture scroll, it is possible to easily normalize the height of the picture by utilizing the upper and the lower boundaries of the picture. In this way, the present invention has various good advantages.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

The invention claimed is:

1. An image processing method for stitching a plurality of images including regions which are to be overlapped with each other at said regions to form a single image, comprising steps of:

accepting input of a first image, a second image including a region to be overlapped with said first image, and a third image including a region to be overlapped with said second image;

matching scales of said inputted images to each other;

obtaining a plurality of corresponding points corresponding between said first image and said second image which match each other in scale;

obtaining a plurality of corresponding points corresponding between said second image and said third image which match each other in scale;

calculating a planar projective transform matrix, for transforming said second image, indicating a geometric relationship of said second image with respect to said first and said third images based on the obtained corresponding points between respective images;

executing planar projective transformation of said second image based on the calculated planar projective transform matrix; and stitching said second image after the planar projective transformation with said first and said third images.

2. The image processing method as set forth in claim 1, wherein said step of stitching said second image after the planar projective transformation with said first and said third images further comprising steps of:

obtaining, for each pixel, positional relationship between pixels in said second image and corresponding pixels in said first and said third images with respect to the pixels in respective overlap regions; and stitching the images based on the obtained positional relationship.

3. The image processing method as set forth in claim 1, wherein said step of matching scales of the inputted images to each other further comprising steps of:

designating two line segments which are to be parallel with each other in each of the images;

calculating a planar projective transform matrix based on coordinates of end points of the two designated line segments for parallelizing said designated two line segments; and executing planar projective transformation of said images based on the calculated planar projective transform matrix.

4. The image processing method as set forth in claim 3, wherein said step of stitching said second image after the planar projective transformation with said first and said third images further comprising steps of:

obtaining, for each pixel, positional relationship between pixels in said second image and corresponding pixels in said first and said third images with respect to pixels in respective overlap regions; and stitching said images based on said obtained positional relationship.

5. An image processing apparatus for stitching a plurality of images including regions which are to be overlapped with each other at said regions to form a single image, comprising:

accepting means for accepting input of a first image, a second image including a region to be overlapped with said first image, and a third image including a region to be overlapped with said second image;

scale matching means for matching scales of said images inputted from said image accepting means to each other;

first corresponding point extracting means for obtaining a plurality of corresponding points corresponding between said first image and said second image which match each other in scale;

second corresponding point extracting means for obtaining a plurality of corresponding points corresponding between said second image and said third image which match each other in scale;

calculating means for calculating a planar projective transform matrix for transforming said second image, indicating a geometric relationship of said second image with respect to said first and said third images based on said corresponding points obtained by said first and said second corresponding point extracting means;

image transforming means for executing planar projective transformation of said second image based on said calculated planar projective transform matrix; and image stitching means for stitching said second image after said planar projective transformation with said first and said third images.

6. The image processing apparatus as set forth in claim 5, wherein, in stitching said second image with said first and said third images, said image stitching means configured to obtain, for each pixel of an image, positional relationship between pixels in said second image and corresponding pixels in said first and said third images with respect to pixels in respective overlap regions, and stitches said images based on said obtained positional relationship.

7. The image processing apparatus as set forth in claim 5, wherein said scale matching means comprising:
  means for accepting designation of two line segments which are to be parallel with each other in each of said images;
  means for calculating a planar projective transform matrix based on coordinates of end points of said two designated line segments for parallelizing said two line segments; and
  means for executing planar projective transformation of said images based on said calculated planar projective transform matrix.

8. The image processing apparatus as set forth in claim 7, wherein, in stitching said second image with said first and said third images, said image stitching means configured to obtain, for each pixel of an image, positional relationship between pixels in said second image and corresponding pixels in said first and said third images with respect to pixels in respective overlap regions, and stitches said images based on said obtained positional relationship.

9. An image processing apparatus for stitching a plurality of images including regions which are to be overlapped with each other at said regions to form a single image, comprising processor capable of performing operations of:
  accepting input of a first image, a second image including a region to be overlapped with said first image, and a third image including a region to be overlapped with said second image;
  matching scales of said inputted images to each other;
  obtaining a plurality of corresponding points corresponding between said first image and said second image which match each other in scale;
  obtaining a plurality of corresponding points corresponding between said second image and said third image which match each other in scale;
  calculating a planar projective transform matrix, for transforming said second image, indicating a geometric relationship of said second image with respect to said first and said third images based on said obtained corresponding points;
  executing planar projective transformation of said second image based on said calculated planar projective transform matrix; and
  stitching said second image after said planar projective transformation with said first and said third images.

10. The image processing apparatus as set forth in claim 9, wherein, in stitching said second image with said first and said third images, said operation of stitching images obtains, for each pixel of an image, positional relationship between pixels in said second image and corresponding pixels in said first and said third images with respect to pixels in respective overlap regions, and stitches said images based on said obtained positional relationship.

11. The image processing apparatus as set forth in claim 9, wherein said operation of scale matching further comprising operations of:
  accepting designation of two line segments which are to be parallel with each other in each of said images;
  calculating a planar projective transform matrix based on coordinates of end points of said two designated line segments for parallelizing said two line segments; and
  executing planar projective transformation of said images based on said calculated planar projective transform matrix.

12. The image processing apparatus as set forth in claim 11, wherein, in stitching said second image with said first and said third images, said operation of stitching images obtains, for each pixel of an image, positional relationship between pixels in said second image and corresponding pixels in said first and said third images with respect to pixels in respective overlap regions, and stitches said images based on said obtained positional relationship.

13. A computer readable medium having stored thereon computer executable process steps operative to perform a method causing a computer to stitch a plurality of images including regions which are to be overlapped with each other at said regions to form a single image, the method comprising the steps of:
  causing the computer to match scales of inputted images to each other which include a first image, a second image including a region to be overlapped with said first image and a third image including a region to be overlapped with said second image;
  causing the computer to obtain a plurality of corresponding points corresponding between said first image and said second image which match each other in scale;
  causing the computer to obtain a plurality of corresponding points corresponding between said second image and said third image which match each other in scale;
  causing the computer to calculate a planar projective transform matrix, for transforming said second image, indicating a geometric relationship of said second image with respect to said first and said third images based on said obtained corresponding points between respective images;
  causing the computer to execute planar projective transformation of said second image based on said calculated planar projective transform matrix; and
  causing the computer to stitch said second image after said planar projective transformation with said first and said third images.

14. A computer memory product for causing a computer to stitch a plurality of images including regions which are to be overlapped with each other at said regions to form a single image, readable by a computer, containing a program, said computer program comprising steps of:
  causing the computer to match scales of inputted images to each other which include a first image, a second image including a region to be overlapped with said first image and a third image including a region to be overlapped with said second image;
  causing the computer to obtain a plurality of corresponding points corresponding between said first image and said second image which match each other in scale;
  causing the computer to obtain a plurality of corresponding points corresponding between said second image and said third image which match each other in scale;
  causing the computer to calculate a planar projective transform matrix, for transforming said second image, indicating a geometric relationship of said second image with respect to said first and said third images based on said obtained corresponding points between respective images;
  causing the computer to execute planar projective transformation of said second image based on said calculated planar projective transform matrix; and
  causing the computer to stitch said second image after said planar projective transformation with said first and said third images.

* * * * *